United States Patent [19]
Isetani

[11] Patent Number: 4,615,143
[45] Date of Patent: Oct. 7, 1986

[54] DOOR GLASS GUIDE MECHANISM FOR MOTOR VEHICLE
[75] Inventor: Hideki Isetani, Nagoya, Japan
[73] Assignee: Toyota Jidosha Kabushiki Kaisha, Japan
[21] Appl. No.: 634,549
[22] Filed: Jul. 26, 1984
[30] Foreign Application Priority Data
  Jul. 27, 1983 [JP] Japan .......................... 58-116825[U]
[51] Int. Cl.⁴ .............................................. E05F 11/38
[52] U.S. Cl. ...................................... 49/374; 49/226; 49/227
[58] Field of Search .......................... 49/374, 226, 227
[56] References Cited
U.S. PATENT DOCUMENTS

| | | | |
|---|---|---|---|
| 2,024,773 | 12/1935 | Lohrman | 49/374 |
| 2,746,747 | 5/1956 | Lautenbach | 49/227 |
| 2,941,838 | 6/1960 | Wernig | 49/374 |
| 3,062,528 | 11/1962 | Martens | 49/227 |
| 3,333,363 | 8/1967 | Garvey | 49/374 |
| 3,541,732 | 11/1970 | Hanson | 49/227 |
| 4,121,381 | 10/1978 | Grantz et al. | 49/227 |
| 4,240,227 | 12/1980 | Hasler et al. | 49/374 |
| 4,400,913 | 8/1983 | Krantz et al. | 49/374 |
| 4,407,540 | 10/1983 | Korff | 49/227 |

FOREIGN PATENT DOCUMENTS 739547 11/1955 United Kingdom ................... 49/227
913073 12/1962 United Kingdom ................... 49/227

Primary Examiner—Victor N. Sakran
Attorney, Agent, or Firm—Finnegan, Henderson, Farabow, Garrett & Dunner

[57] ABSTRACT

This disclosure depicts a mechanism for guiding movement of a door glass in a motor vehicle door having a door panel, front side door frame, and a rear side door frame that leans forwardly. The mechanism includes a door frame glass guide formed in the front of the rear side frame, for guiding a rear end edge of the door glass in the vertical direction and restraining the rear end edge of the door glass from moving in the direction of the thickness of the door glass. The mechanism also includes a front guide for guiding the forward end portion of the door glass in the vertical direction at least to a predetermined partially opened portion below a beltline portion of the door panel and restraining the door glass from moving in the direction of the thickness of the door glass. The mechanism is constructed such that the door glass is guided parallelly along the rear side door frame within the range from the fully closed position to the predetermined partially opened position and the rear end edge of the door glass is guided in a manner to rock about a bottom end position of the front guide between the partially opened position and a fully opened position.

28 Claims, 5 Drawing Figures

DOOR GLASS GUIDE MECHANISM FOR MOTOR VEHICLE

BACKGROUND OF THE INVENTION

1. Field of the Invention

This invention relates to a door glass guide mechanism for a motor vehicle, and more particularly to improvements in a door glass guide mechanism for a motor vehicle, being suitable for use in a side door having a rear side door frame inclined along a center pillar leaned forwardly.

2. Description of the Prior Art

Recently, in so-called sporty type motor vehicles, such as for example two-door type passenger cars, the center pillars have been designed to lean forwardly to express a sporty feeling. In accordance thereto, such side doors have been used as to have rear side door frames leaned forwardly along the center pillars.

As the conventional door glass guide mechanism in a door for motor vehicle, being used at the time of opening or closing a door glass, as shown in FIG. 4, there has been one in which the aforesaid mechanism comprises: a door frame glass guide 17 formed at the front side of a rear side door frame 12A and having a U-shape in cross-section; a rear guide 18 formed from the top to the bottom in alignment with the door frame glass guide 17 at the rear portion in door panel 16; and a front guide 19 formed from the top to the bottom in parallel to the rear guide 18 to a position upwardly of a beltline portion 16A at the front portion in the door panel 16; whereby a door glass 14 is guided in the vertical direction in a substantially horizontal posture by the rear and the front guides 18 and 19, while being held in a direction of the thickness thereof by the door frame glass guide 17. In the drawing, designated at 15 is a triangular patch. In this case, the rigidity of holding the door glass 14 in the direction of the thickness of the door glass 14 in the state where the door glass 14 is opened is high, so that the door glass 14 can be moved in the vertical direction without the door glass 14 being unstable.

However, with the door in which the rear side door frame 12A is forwardly leaned, the door glass 14 is received in the door panel 15 in such a manner that the door glass 14 is moved obliquely and rearwardly along the rear guide 18 being in alignment with the door frame glass guide 17 at the front side of the rear side door frame 12A, whereby the rearward bulge-out of the door panel 18 is increased. The necessity of securing a space for installing functional parts such as door lock means 17 and the like at the rear portion in the door panel 16 disadvantageously leads to a further large-sized door. (Refer to solid lines A in FIG. 4).

To obviate the above-described disadvantage, there may be proposed a method of reducing the forwardly leaning angle of the front portion of the forwardly leaned rear side frame 12A to decrease the angle of the door glass 14 entering the interior of the door panel 16 (Refer to two-dot chain line B in FIG. 4). However, in this case, the rear side door frame 12A is increased in its width in the vicinity of the beltline 16A of the door panel 16, thereby presenting such new disadvantages that the appearance is deteriorated and the field of view in the lateral direction is adversely affected.

Furthermore, in view of the fact that the door glass 14 is received in the door panel in a manner to be moved along the rear side door frame 12A, whereby the rear portion of the door panel 16 is bulged rearwardly, there may be proposed that, as shown in FIG. 5, at the front and the rear portions in the door panel 16, there may be provided a rear guide 28 and a front guide 29 for engaging the bottom end portions in the front and the rear of the door glass 14 to determine the moving path of the door glass 14, and the door glass 14 is arranged to vertically move along the rear and the front guides 28 and 29, whereby, irrespective of the forwardly leaning angle of the rear side door frame 12A, the door glass 14 is received in the door panel 12 without the rear portion of the door panel 16 being bulged out.

However, in this case, such a disadvantage is presented that, in the state where the door glass 14 is opened, only the lower end portion in the door panel 16 of the door glass 14 is held by a stabilizer 27, rear guide 28 and front guide 29, whereby the looseness of the upper portion of the door glass 14 in the direction of the thickness of the door glass 14 is increased.

SUMMARY OF THE INVENTION

It is therefore the primary object of the present invention to provide a door glass guide mechanism for a motor vehicle, wherein the rigidity of holding a door glass in a direction of the thickness of the door glass is increased without increasing the lower portion of a rear side door frame in its width and irrespective of the forwardly leaning angles of a door frame and the door glass, and moreover, the door glass can be received in a door panel without making the door panel large-sized.

To this end, the present invention contemplates that, in a door glass guide mechanism for a motor vehicle having a glass guide including: a door frame glass guide in a door for the motor vehicle, having a forwardly leaned door frame in the rear and formed in the front of the rear side frame, for guiding the rear end edge of the door glass in the vertical direction and restraining the rear end edge of the door glass in the direction of the thickness of the door glass; and a front guide for guiding the forward end portion of the door glass in the vertical direction at least to below a beltline portion of the door panel and restraining the door glass in the direction of the thickness of the door glass; the glass guide is constructed such that the door glass is guided parallelly along the rear side door frame within the range from the fully closed state of the door glass to an initial window opening movement and the rear end edge of the door glass is guided in a manner to rock about the bottom end position of the front guide within the range from the fully opened state of the door glass to an initial window closing movement.

To the above end, the present invention contemplates that said front guide is formed in parallel to said rear side door frame, said door glass is parallelly moved to the bottom end position of said front guide, and thereafter, the side of the rear end edge of said door glass is rockingly rotated about the forward end portion of the door glass.

To the above end, the present invention contemplates that, in addition to the door frame glass guide and the front guide, the glass guide further comprises: a guide at the rear end of the door glass, for guiding an upper end portion of the rear end edge of the door glass in the door panel along a rocking path of the upper end portion about the forward end portion of the door glass; and a rear guide for guiding the lower rear portion of the door glass along a vertically moving and a rocking path of in the door panel.

To the above end, the present invention contemplates that the guide at the rear end of the door glass is formed into a circularly arcuate shape along the rocking path of the upper end portion of the rear end edge of the door glass about the bottom end position of the front guide from the bottom end portion of the rear side door frame to the interior of the door panel.

To the above end, the present invention contemplates that the front guide is formed substantially in parallel to the door frame glass guide from the interior of the rear end of the triangular patch formed at a position between the forward end portion of the beltline portion and the front side door frame to the upper side of the interior of the door panel.

To the above end, the present invention contemplates that the rear guide is continuously formed in the rear portion of the interior of the door panel along a moving path including: a vertically moving path substantially rectilinear and parallel to the door frame glass guide in the lower rear portion of the door glass; and a circularly arcuate rocking path continuing to downwardly from the vertically moving path and rocking about the bottom end position of the front guide.

To the above end, the present invention contemplates that secured to the top end portion of the rear end edge of the door glass is a substantially crank-shaped door glass piece having offset therefrom into the compartment a forward end slide portion guided by the door glass frame guide and the guide on the side of the rear end of the door glass, whereby a difference in stage in the direction of the thickness of the door glass is given from the rear end edge of the door glass to the door frame glass guide and the guide at the rear end of the door glass.

According to the present invention, the door glass is constantly held in the direction of the thickness of the door glass as the door glass is opened, whereby the rigidity of holding the door glass in the direction of the thickness of the door glass is high. Moreover, the door glass is received in the door panel in such a manner that the door glass rear end edge is rocked about the forward end portion of the door glass, so that the space for installing functional parts such as door lock means and the like can be secured without rendering the door panel large in size beyond necessity.

DETAILED DESCRIPTION OF THE PREFERRED EMBODIMENT

A detailed description will hereunder be given of one embodiment of the present invention with reference to the drawings.

Figure 4:
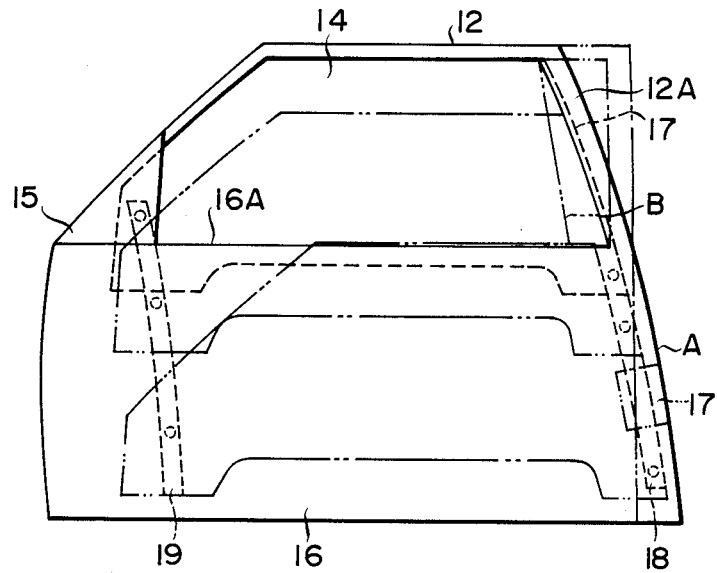
FIGS. 4 and 5 are schematic side views showing the arrangement of the conventional door glass guide mechanism in a motor vehicle.
Figure 5:
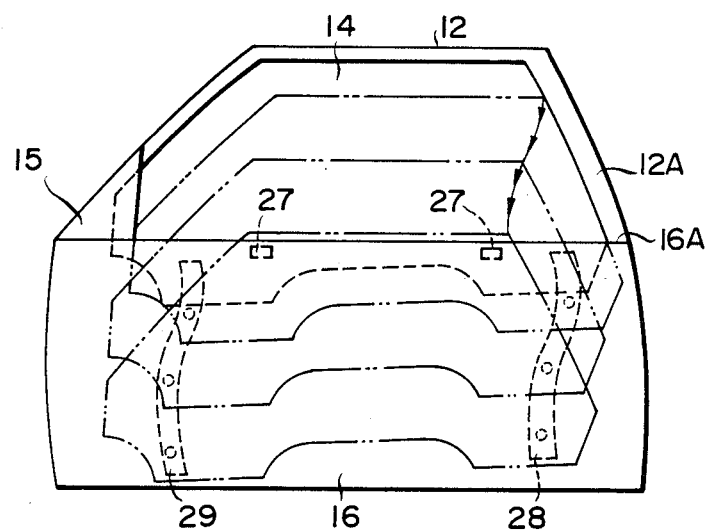

The reference characters shown in the door glass guide mechanism of FIGS. 4 and 5 are used throughout the figures to designate the same or similar parts, so that detailed description of those parts will be omitted.

Figure 1:
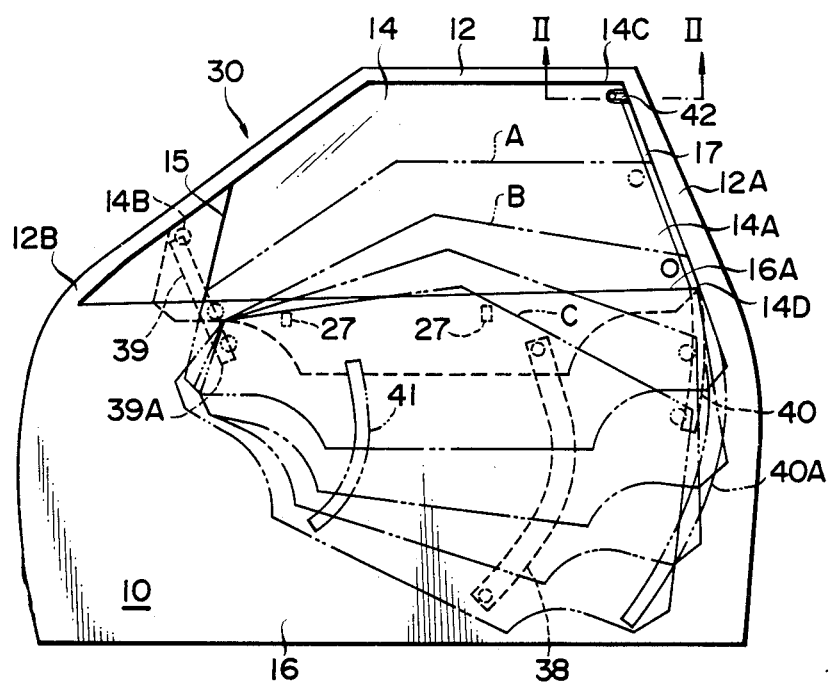
FIG. 1 is a schematic side view showing the arrangement of an embodiment of the door glass guide mechanism for a motor vehicle according to the present invention.

As shown in FIG. 1, this embodiment, in a door glass guide mechanism 30 of this invention will be shown as applied to a side door 10 for the motor vehicle having a door frame 12 that leans forwardly in the rear. Integrally formed in the front of the rear side door frame 12A is a door frame glass guide 17, for guiding the rear end edge 14A of the door glass 14 in the vertical direction and restraining the rear end edge 14A of the door glass 14 from moving in the direction of the thickness of the door glass 14. Mechanism 30 also includes a front guide 39 for guiding the forward end portion 14B of the door glass 14 in the vertical direction at least to below the beltline portion 16A of the door panel 16 and restraining the forward end portion 14B of the door glass 14 from moving in the direction of the thickness of the door glass. The door glass guide mechanism is constructed such that the door glass 14 is guided parallelly along the rear side door frame 12A within the range from a fully closed state of the door glass 14 to a predetermined partially opened state, e.g., a substantially half-open window state (indicated by two-dot chain line A in the drawing), and the rear end edge 14A of the door glass 14 is guided in a manner to rock about the bottom end position of the front guide 39 within the range from the predetermined partially opened state to a fully opened state of the door glass 14.

In addition to the door frame glass guide 17 and the front guide 39, the door glass guide mechanism further comprises: an upper end guide 40 at the rear end of the door glass 14, for guiding an upper end portion 14C of the rear end edge 14A of the door glass in the door panel 16 along a rocking path centered about the forward end portion 14B of the door glass 14; and a rear guide 38 for guiding the lower rear portion of the door glass 14 along the vertically moving and a rocking paths of the lower rear portion of the door glass 14 in the door panel 16.

The front guide 39 is formed substantially parallel to the door frame glass and guide 17 and extends from the interior of the rear end of the triangular patch 15 formed at a position between the forward end portion of the beltline portion 16A and the front side door frame 12B to the upper side of the interior of the door panel 16.

The upper end guide guide 40 at the rear end of the door glass if formed into a circularly arcuate shape along the rocking path of the upper end portion 14C of the rear end edge 14A of the door glass 14 about the bottom end position 39A of the front guide 39. Upper end guide 40 extends from the bottom end portion of the rear side door frame 12A to the interior of the door panel 16.

The rear guide 38 is continuously formed in rear portion of the interior of the door panel 16 along a moving path including a vertically moving path substantially rectilinear and parallel to the door frame glass guide 17 in the lower rear portion of the door glass 14 and a circularly arcuate rocking path continuing to downwardly from the vertically moving path and rocking about the bottom end position 39A of the front guide 39.

Figure 2:
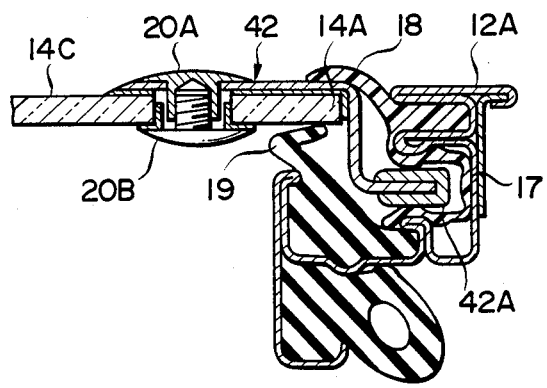
FIG. 2 is an enlarged sectional view taken along the line II—II in FIG. 1.
Figure 3:
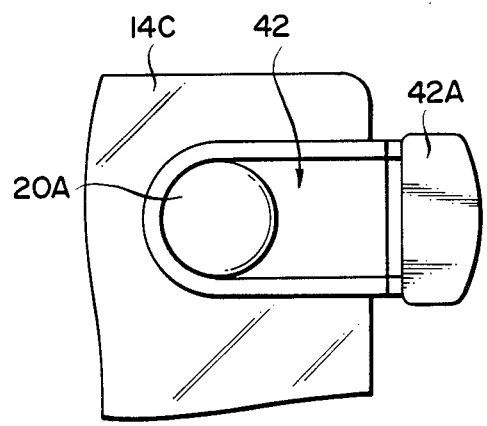
FIG. 3 is an enlarged side view showing the door glass piece and thereabout in this embodiment.

Further, as shown in FIGS. 2 and 3, secured to the top end portion 14C of the rear end edge 14A of the door glass is a substantially crank-shaped door glass piece 42 having offset therefrom into the compartment a forward end slide portion 42A guided by the door frame glass guide 17 and the upper end guide 40 on the side of the rear end of the door glass, whereby a difference in stage in the direction of the thickness of the door glass is given from the rear end edge 14A of the door glass 14 to the door grame glass guide 17 and the upper end guide 40 at the rear end of the door glass 14. In consequence, the upper end guide 40 at the rear end of the door glass 14 can restrain the top end portion 14C of the rear end edge 14A of the door glass 14 from moving in the direction of the thickness of the door glass and guide the same without interfering with the bottom end portion of the rear end edge 14A of the door glass 14 as the rear end edge 14A of the door glass 14 is moved in the vertical direction and displaced rockingly.

In the drawing, designated at 18 is a glass run for sealing the outer surface of the rear end edge 14A of the door glass 14, at 19 a door glass weather strip for sealing between the rear end edge 14A of the door glass 14 and the rear side door frame 12A, at 20A a fixing nut, and at 20B a fixing screw.

Description will now be given of action of this embodiment.

During the window opening operation of the door glass 14, the door glass 14 descends in the substantially horizontal posture along the rear guide 38 and the front guide 39 with the rear end edge 14A thereof being restrained from moving in the direction of the thickness thereof, within the range from the fully closed state to the substantially half-open state (indicated by two-dot chain line A in FIG. 1.)

Within the range from the substantially half-open state to the substantially ⅔-open state (indicated by two-dot chain line B in FIG. 1), the forward end portion 14B of the door glass 14 moves along the front guide 39 to the bottom end portion 39A, and simultaneously, the rear end edge 14A of the door glass 14 descends, rocking about the forward end portion 14B of the door glass 14 in the clockwise direction in the drawing.

At this time, the top end portion 14C of the rear end edge 14A of the door glass 14 is displaced along the door frame glass guide 17, drawing a circularly arcuately moving path being approximate to a straight line. In consequence, the shape of the door frame glass guide 17 can be formed into a substantially rectilinear shape, and the door glass 14 can be restrained from moving in the direction of the thickness of the door glass 14 without making the rear side door frame 12A have a large width.

Further, within the range from the substantially ⅔-open state to the fully opened state (indicated by two-dot chain line C in FIG. 1), the rear end edge 14A of the door glass 14 rotates about the forward end portion 14B of the door glass 14 located at the bottom end position 39A of the front guide 39 further in the clockwise direction, whereby the door glass 14 is received in the door panel 16.

Additionally, in the case of closing operation of the door glass 14, the preceding steps are reversed to close the door glass 14.

According to this embodiment, the door glass 14 is lowered in a substantially horizontal posture along the door frame glass guide 17 to a substantially half-open state. Thereafter, the side of the rear end edge 14A of the door glass is rockingly rotated about the forward end portion 14B of the door glass 14, and the door glass 14 is received in the door panel 16, whereby, even if the forwardly leaning angles of the door frame 12 and the door glass 14 are large, the door glass 14 can be constantly restrained from moving in the direction of the thickness of the door glass 14 without making the lower portion of the rear side door frame 12A have a large width, and without making the rear side of the door panel 16 bulge out, so that the rigidity of the means restraining the door glass 14 can be increased and the looseness in the top portion of the door glass 14 can be suppressed.

Furthermore, in the case of this embodiment, the front guide 39 is provided from the triangular patch 15 to the upper portion of the interior of the door panel 16, so that the fulcrum, about which the door glass 14 rockingly rotates, which is to be located at the bottom end position 39A of the front guide 39 can be positioned at an upper portion of the door panel 16 close to the beltline portion 16A in the door panel 16, thereby advantageously eliminating necessity of unnecessarily enlarging the door panel in size due to the increase in height of the bottom end position of the rocking path of the door glass 14 in the downward direction.

Further, the door glass 14 is of such an arrangement as to rotatably move, descending from the substantially half-open state, so that, even with the straight-lined rear side door frame 12A, the rear end edge 14A of the door glass 14 can be constantly restrained by the rear side door frame 12A from moving in the direction of the thickness of the door glass 14. However, the arrangement of the glass guide need not necessarily be limited to this, and, for example, such an arrangement may be adopted that the front guide 39 is formed in parallel with the rear side door frame 12A, whereby the door glass 14 is parallelly moved to the bottom end position 39A of the front guide 39, and thereafter, the side of the rear end edge 14A of the door glass 14 is rockingly rotated about the forward end portion 14B of the door glass 14.

Furthermore, in the above embodiment, the rear guide 38 is provided for guiding the door glass 14 in the door panel 16, however, the present invention need not necessarily be limited to this, and, for example, when the rigidity of restraining the door glass 14 in the door panel 16 by the upper end guide 40 at the rear end of the door glass is satisfactory, there is no need of providing the rear guide 38, and such an arrangement may be adopted that, to reliably guide the door glass 14, a center guide (indicated by two-dot chain line 41 in FIG. 1) may be provided between the rear guide 38 and the front guide 39.

Further, in the above embodiment, to hold the door glass 14, the door glass piece 42 secured to the top end portion 14C of the rear end edge 14A of the door glass 14 is held by the door frame glass guide 17 and the upper end guide 40 at the rear end of the door glass. However, the present invention need not necessarily be limited to this, and, for example, such an arrangement may be adopted that, in place of the aforesaid upper end guide 40 at the rear end of the door glass 14, a guide at the rear end of the door glass 14, for clamping the rear end edge 14A of the door glass 14 is provided in the door panel 16, whereby, the rear end edge 14A of the door glass 14 is restrained from moving in the direction of the thickness of the door glass 14 by the door frame glass guide 17 in an area upwardly of the beltline portion 16A, and the rear end edge 14A of the door glass 14 is held by the guide at the rear end of the door glass 14 in a manner to extend rearwardly in an area downwardly of the beltline portion 16A.

Furthermore, in the above embodiment, such an arrangement may be adopted that there is additionally provided a second guide at the rear end of the door glass (Refer to two-dot chain lines 40A in FIG. 1), for holding the lower end portion of the rear end edge 14A of the door glass 14 in the direction of the thickness of the door glass 14 in the door panel 16 and guiding the same, and further, door glass pieces similar to that in the above embodiment are secured to the forward end portion 14B and the bottom end portion 14D of the door glass 14, whereby a difference in stage in the direction of the thickness of the door glass is given from the surface of the door glass 14 to the door frame glass guide 17, the front guide 38, the upper end guide 40 at the rear end of the door glass and the second guide 40A at the rear end of the door glass 14. This arrangement is suitable for use in the door in which the surface of the door glass 14 and the outer surface of the door are made flush with each other.

What is claimed is:

1. A mechanism for guiding movement of a door glass in a motor vehicle door having a door panel, a front side door frame, and a rear side door frame, said rear side door frame leaning forwardly above the beltline of said door, said door glass guide mechanism comprising:

front door glass guide means, including a front guide, for restraining the forward end portion of said door glass from moving in the direction of the thickness of said door glass and for guiding said forward end portion of said door glass as said door glass moves vertically between a fully closed position, in which said forward end portion of said door glass is located at said front side door frame, and a predetermined partially opened position, in which said forward end portion of said door glass is located below said beltline at a bottom end position of said front guide; and rear door glass guide means, including a door frame glass guide formed along the front portion of said rear side door frame, for restraining the rear end edge of said door glass from moving in the direction of the thickness of said door glass and for guiding said rear end edge of said door glass as said door glass moves vertically between said fully closed position and a fully opened position, said rear door glass guide means cooperating with said front door glass guide means to guide said door glass to move parallel to said rear side door frame between said fully closed position and said predetermined partially opened position, and to pivot between said predetermined partially opened position and said fully opened position about said forward end portion of said door glass located at said bottom end position of said front guide.

2. A door glass guide mechanism for a motor vehicle as set forth in claim 1, wherein said front guide is formed in parallel to said rear side door frame.

3. A door glass guide mechanism for a motor vehicle as set forth in claim 1, wherein said rear door glass guide means further comprises:

an upward end guide extending below said beltline at said rear end edge of said door glass and guiding the upper end portion of said rear end edge of said door glass in said door panel along an arcuate rocking path centered at said forward end portion of said door glass; and a rear guide positioned below said beltline and guiding the lower rear portion of said door glass vertically between said fully closed and partially opened positions and pivotally between said partially opened and fully opened positions.

4. A door glass guide mechanism for a motor vehicle as set forth in claim 2, wherein said rear door glass guide means further comprises:

an upward end guide extending below said beltline at said rear end edge of said door glass and guiding the upper end portion of said rear end edge of said door glass in said door panel along an arcuate rocking path centered at said forward end portion of said door glass; and a rear guide positioned below said beltline and guiding the lower rear portion of said door glass vertically between said fully closed and partially opened positions and pivotally between said partially opened and fully opened positions.

5. A door glass guide mechanism for a motor vehicle as set forth in claim 3, wherein said upper end guide is formed into an arcuate shape along said rocking path of said upper end portion of said rear end edge of said door glass and extends from the bottom end portion of said rear side door frame to the interior of said door panel.

6. A door glass guide mechanism for a motor vehicle as set forth in claim 4, wherein said upper end guide is formed into an arcuate shape along said rocking path of said upper end portion of said rear end edge of said door glass and extends from the bottom end portion of said rear side door frame to the interior of said door panel.

7. A door glass guide mechanism for a motor vehicle as set forth in claim 1, wherein said door frame includes a triangular patch positioned between the forward end portion of said beltline and said front side door frame, and said front guide is formed substantially parallel to said door frame glass guide and extends from the interior of the rear end of said triangular patch to the upper side of the interior of door panel.

8. A door glass guide mechanism for a motor vehicle as set forth in claim 2, wherein said door frame includes a triangular patch positioned between the forward end portion of said beltline and said front side door frame, and said front guide is formed substantially parallel to said door frame glass guide and extends from the interior of the rear end of said triangular patch to the upper side of the interior of said door panel.

9. A door glass guide mechanism for a motor vehicle as set forth in claim 3, wherein said door frame includes a triangular patch positioned between the forward end portion of said beltline and said front side door frame, and said front guide is formed substantially parallel to said door frame glass guide and extends from the interior of the rear end of said triangular patch to the upper side of the interior of said door panel.

10. A door glass guide mechanism for a motor vehicle as set forth in claim 4, wherein said door frame includes a triangular patch positioned between the forward end portion of said beltline and said front side door frame, and said front guide is formed substantially parallel to said door frame glass guide and extends from the interior of the rear end of said triangular patch to the upper side of the interior of said door panel.

11. A door glass guide mechanism for a motor vehicle as set forth in claim 5, wherein said door frame includes a triangular patch positioned between the forward end portion of said beltline and said front side door frame, and said front guide is formed substantially parallel to said door frame glass guide and extends from the interior of the rear end of said triangular patch to the upper side of the interior of said door panel.

12. A door glass guide mechanism for a motor vehicle as set forth in claim 6, wherein said door frame includes a triangular patch positioned between the forward end portion of said beltline and said front side door frame, and said front guide is formed substantially parallel to said door frame glass guide and extends from the interior of the rear end of said triangular patch to the upper side of the interior of said door panel.

13. A door glass guide mechanism for a motor vehicle as set forth in claim 3, wherein said rear guide is continuously formed in the rear portion of the interior of said door panel along a moving path including: a vertically moving path substantially rectilinear and parallel to said door frame glass guide; and a circularly arcuate rocking path continuing downwardly from said vertically moving path and being centered about said bottom end position of said front guide.

14. A door glass guide mechanism for a motor vehicle as set forth in claim 4, wherein said rear guide is continuously formed in the rear portion of the interior of said door panel along a moving path including: a vertically moving path substantially rectilinear and parallel to said door frame glass guide; and a circularly arcuate rocking path continuing downwardly from said vertically moving path and being centered about said bottom end position of said front guide.

15. A door glass guide mechanism for a motor vehicle as set forth in claim 5, wherein said rear guide is continuously formed in the rear portion of the interior of said door panel along a moving path including: a vertically moving path substantially rectilinear and parallel to said door frame glass guide; and a circularly arcuate rocking path continuing downwardly from said vertically moving path and being centered about said bottom end position of said front guide.

16. A door glass guide mechanism for a motor vehicle as set forth in claim 6, wherein said rear guide is continuously formed in rear portion of the interior of said door panel along a moving path including: a vertically moving path substantially rectilinear and parallel to said door frame glass guide; and a circularly arcuate rocking path continuing downwardly from said vertically moving path and being centered about said bottom end position of said front guide.

17. A door glass guide mechanism for a motor vehicle as set forth in claim 9, wherein said rear guide is continuously formed in the rear portion of the interior of said door panel along a moving path including: a vertically moving path substantially rectilinear and parallel to said door frame glass guide; and a circularly arcuate rocking path continuing downwardly from said vertically moving path and being centered about said bottom end position of said front guide.

18. A door glass guide mechanism for a motor vehicle as set forth in claim 10, wherein said rear guide is continuously formed in the rear portion of the interior of said door panel along a moving path including: a vertically moving path substantially rectilinear and parallel to said door frame glass guide; and a circularly arcuate rocking path continuing downwardly from said vertically moving path and being centered about said bottom end position of said front guide.

19. A door glass guide mechanism for a motor vehicle as set forth in claim 11, wherein said rear guide is continuously formed in the rear portion of the interior of said door panel along a moving path including: a vertically moving path substantially rectilinear and parallel to said door frame glass guide; and a circularly arcuate rocking path continuing downwardly from said vertically moving path and being centered about said bottom end position of said front guide.

20. A door glass mechanism for a motor vehicle as set forth in claim 12, wherein said rear guide is continuously formed in the rear portion of the interior of said door panel along a moving path including: a vertically moving path substantially rectilinear and parallel to said door frame glass guide; and a circularly arcuate rocking path continuing downwardly from said vertically moving path and being centered about said bottom end position of said front guide.

21. A door glass guide mechanism for a motor vehicle as set forth in claim 3, wherein said rear door glass guide means further includes, secured to the top end portion of said rear end edge of said door glass, a substantially crank-shaped door glass piece having offset therefrom toward the interior of said motor vehicle a forward end slide portion guided by said door glass frame guide and said upper end guide, whereby a difference in stage in the direction of the thickness of the door glass is given from said rear end edge of said door glass to the door frame glass guide and the upper end guide.

22. A door glass guide mechanism for a motor vehicle as set forth in claim 4, wherein said rear door glass guide means further includes, secured to the top end portion of said rear end edge of said door glass, a substantially crank-shaped door glass piece having offset therefrom toward the interior of said motor vehicle a forward end slide portion guided by said door glass frame guide and said upper end guide, whereby a difference in stage in the direction of the thickness of the door glass is given from said rear end edge of said door glass to the door frame glass guide and the upper end guide.

23. A door glass guide mechanism for a motor vehicle as set forth in claim 5, wherein said rear door glass guide means further includes, secured to the top end portion of said rear end edge of said door glass, a substantially crank-shaped door glass piece having offset therefrom toward the interior of said motor vehicle a forward end slide portion guided by said door glass frame guide and said upper end guide, whereby a difference in stage in the direction of the thickness of the door glass is given from said rear end edge of said door glass to the door frame glass guide and the upper end guide.

24. A door glass guide mechanism for a motor vehicle as set forth in claim 6, wherein said rear door glass guide means further includes, secured to the top end portion of said rear end edge of said door glass, a substantially crank-shaped door glass piece having offset therefrom toward the interior of said motor vehicle a forward end slide portion guided by said door glass frame guide and said upper end guide, whereby a difference in stage in the direction of the thickness of the door glass is given from said rear end edge of said door glass to the door frame glass guide and the upper end guide.

25. A door glass guide mechanism for a motor vehicle as set forth in claim 13, wherein said rear door glass guide means further includes, secured to the top end portion of said rear end edge of said door glass, a substantially crank-shaped door glass piece having offset therefrom toward the interior of said motor vehicle a forward end slide portion guided by said door glass frame guide and said upper end guide, whereby a difference in stage in the direction of the thickness of the door glass is given from said rear end edge of said door glass to the door frame glass guide and the upper end guide.

26. A door glass guide mechanism for a motor vehicle as set forth in claim 14, wherein said rear door glass guide means further includes, secured to the top end portion of said rear end edge of said door glass, a substantially crank-shaped door glass piece having offset therefrom toward the interior of said motor vehicle a forward end slide portion guided by said door glass frame guide and said upper end guide, whereby a difference in stage in the direction of the thickness of the door glass is given from said rear end edge of said door glass to the door frame glass guide and the upper end guide.

27. A door glass guide mechanism for a motor vehicle as set forth in claim 15, wherein said rear door glass guide means further includes, secured to the top end portion of said rear end edge of said door glass, a substantially crank-shaped door glass piece having offset therefrom toward the interior of said motor vehicle a forward end slide portion guided by said door glass frame guide and said upper end guide, whereby a difference in stage in the direction of the thickness of the door glass is given from said rear end edge of said door glass to the door frame glass guide and the upper end guide.

28. A door glass guide mechanism for a motor vehicle as set forth in claim 16, wherein said rear door glass guide means further includes, secured to the top end portion of said rear end edge of said door glass, a substantially crank-shaped door glass piece having offset therefrom toward the interior of said motor vehicle a forward end slide portion guided by said door glass frame guide and said upper end guide, whereby a difference in stage in the direction of the thickness of the door glass is given from said rear end edge of said door glass to the door frame glass guide and the upper end guide.

* * * * *